(12) United States Patent
Oka et al.

(10) Patent No.: US 7,777,844 B2
(45) Date of Patent: Aug. 17, 2010

(54) LIQUID CRYSTAL DISPLAYING DEVICE WITH COLOR PIXELS AND IN-CELL RETARDER

(75) Inventors: Shinichiro Oka, Hitachi (JP); Osamu Itou, Hitachi (JP); Shoichi Hirota, Hitachi (JP)

(73) Assignee: Hitachi, Displays, Ltd., Chiba (JP)

( * ) Notice: Subject to any disclaimer, the term of this patent is extended or adjusted under 35 U.S.C. 154(b) by 234 days.

(21) Appl. No.: 12/018,482

(22) Filed: Jan. 23, 2008

(65) Prior Publication Data
US 2008/0198304 A1  Aug. 21, 2008

(30) Foreign Application Priority Data
Feb. 19, 2007  (JP)  ............... 2007-037315

(51) Int. Cl.
G02F 1/1335 (2006.01)
(52) U.S. Cl. ............... 349/114; 349/117; 349/96
(58) Field of Classification Search ............... 349/114, 349/117, 96
See application file for complete search history.

(56) References Cited

U.S. PATENT DOCUMENTS 6,900,866 B2 * 5/2005 Kurtz et al. ............... 349/117
7,173,679 B2 * 2/2007 Doornkamp ............... 349/114
7,597,942 B2 * 10/2009 May et al. ............... 428/1.1
2006/0203162 A1 * 9/2006 Ito et al. ............... 349/117
2006/0238679 A1 * 10/2006 Hirai ............... 349/117
2009/0073352 A1 * 3/2009 Hamilton et al. ............... 349/96

FOREIGN PATENT DOCUMENTS

| JP | 05-100114 | | 4/1993 |
| JP | 2003-279956 | | 10/2003 |
| JP | 2003279956 A | * | 10/2003 |
| JP | 2004-205801 | | 7/2004 |

* cited by examiner

Primary Examiner—Mike Qi
(74) Attorney, Agent, or Firm—Antonelli, Terry, Stout & Kraus, LLP.

(57) ABSTRACT

A transflective liquid crystal display device is arranged to make the overall structure thinner and enhance a reflecting contrast ratio. The transflective liquid crystal display includes a first substrate, a second substrate, a liquid crystal layer laid between the substrates, a first polarization plate located on the opposite side of the first substrate to the side where the liquid crystal layer is located, a second polarization plate located on the opposite side of the second substrate to the side where the liquid crystal layer is located, and a plurality of pixels formed between the substrates, each of the pixels having a reflective area and a transmissive area. An in-cell retarder is located between the second substrate and the liquid crystal layer. An optical compensation film is located between the first substrate and the first polarization plate, between the second substrate and the second polarization plate, or both.

26 Claims, 10 Drawing Sheets (a) TFT SUBSTRATE  (b) CF SUBSTRATE

T : TRANSMISSIVE AREA
R : REFLECTIVE AREA

FIG.11
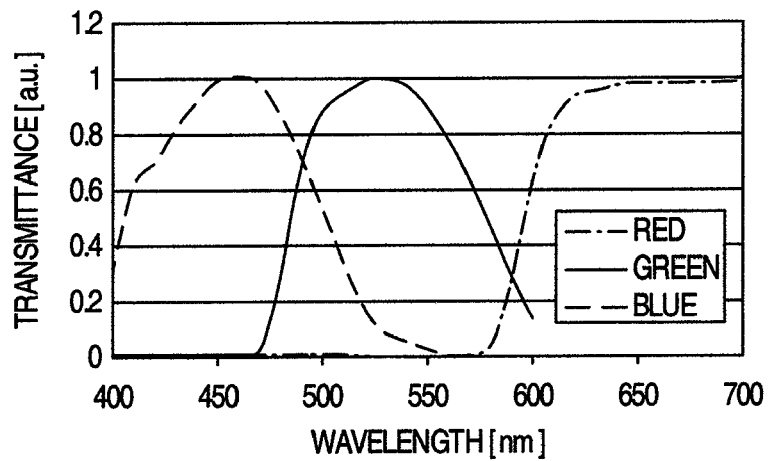
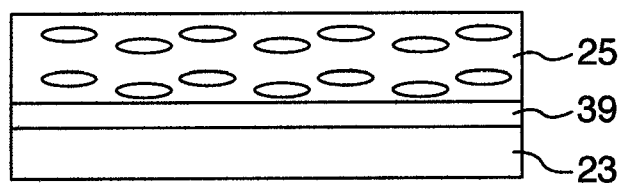
FIG.12A
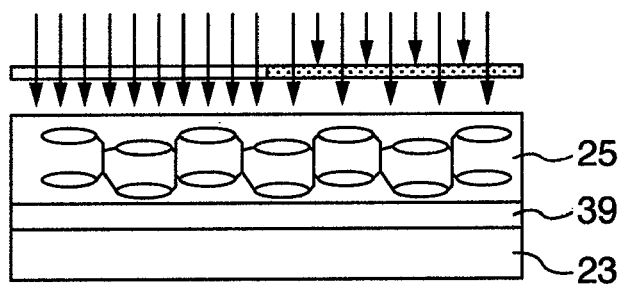
FIG.12B
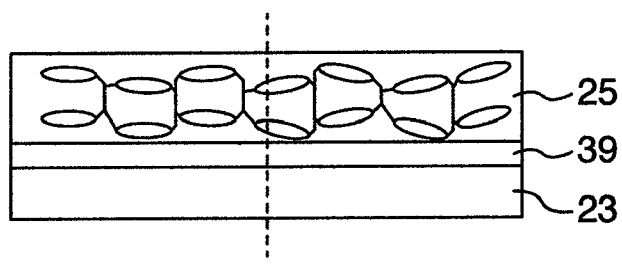
FIG.12C

RED PIXEL   GREEN PIXEL   BLUE PIXEL (a) TFT SUBSTRATE
(b) CF SUBSTRATE

T : TRANSMISSIVE AREA
R : REFLECTIVE AREA (a) TFT SUBSTRATE    (b) CF SUBSTRATE

T: TRANSMISSIVE AREA
R: REFLECTIVE AREA

LIQUID CRYSTAL DISPLAYING DEVICE WITH COLOR PIXELS AND IN-CELL RETARDER

BACKGROUND OF THE INVENTION

1. Field of the Invention

The present invention relates to a liquid crystal display device, and more particularly to a transflective liquid crystal display device.

2. Description of the Related Art

Today, a transflective liquid crystal display device provided with both reflective and transflective display capabilities is now being developed. The transflective liquid crystal display device is arranged to reduce the power consumption in a bright environment by turning off its backlight unit and to allow a user to view an image on the screen in a gloomy or dark environment by turning on the backlight unit. It means that the transflective liquid crystal display is fitted to portable instruments such as a portable phone and a digital camera to be used in many kinds of illuminating environments.

The transflective liquid crystal display device is required so that a transmissive area and a reflective area are individually located in each pixel and each area is designed to have the optimal retardation value. This design can be achieved by making the reflective area stepped and the thickness of the liquid crystal layer of the reflective area about half as long as the thickness of the liquid crystal layer of the transmissive area. Further, to make the optical characteristic of the transmissive area equal to that of the reflective area, the transflective liquid crystal display device is also required to have a retardation film of a λ/4 plate (where λ is a wavelength of light).

The technique of the retardation film has been disclosed in JP-A-2003-279956 and JP-A-Hei5-100114. JP-A-2003-279956 discloses a composition in which a retardation film is built in a liquid crystal cell. JP-A-Hei5-100114 discloses a composition in which a combination of a λ/2 plate and a λ/4 plate is served as a wide circular polarization plate.

Further, another technique of building the retardation film in a reflective TN (Twisted Nematic) system liquid crystal display device has been disclosed in JP-A-2004-205801. JP-A-2004-205801 proposes a method of adjusting a retardation value of a built-in retarder plate according to each color pixel so that the retardation may be λ/4 in each wavelength.

The transflective liquid crystal display device of an ECB (Electrically Controlled Birefringence) system, a VA (Vertical Alignment) system or a TN system is requested to build the retarder plate in it from viewpoints of reduction of coloring when displaying a reflected black image, a high reflective contrast ratio, and thinning. Disadvantageously, these prior art documents do not disclose a way of building the retarder plate in a transflective liquid crystal cell and thus do not bring about a sufficient reflective contrast and so forth.

SUMMARY OF THE INVENTION

The present invention is made in consideration of the foregoing disadvantages, and it is an object of the present invention to provide a transflective liquid crystal display device of each display system which is arranged to reduce coloring when displaying a reflected black image, offer a high reflective contrast ratio, and make the overall body thinner than those of the prior arts.

In carrying out the foregoing object, according to an aspect of the invention, a transflective liquid crystal display device includes a first substrate, a second substrate, a liquid crystal layer laid between the first and the second substrates, a first polarization plate located on the opposite side of the first substrate to the side where the liquid crystal layer is located, a second polarization plate located on the opposite side of the second substrate to the side where the liquid crystal layer is located, a plurality of pixels formed between the first and the second substrates, each of the pixels having a reflective area and a transmissive area, an in-cell retarder being located between the second substrate and the liquid crystal layer, an optical compensation film being located between the first substrate and the first polarization plate, between the second substrate and the second polarization plate, or both.

The "in-cell retarder" termed herein designates a layer having an optical phase difference and being located in a liquid crystal cell as will be discussed below with respect to the embodiments. Further, the "optical compensation film" termed herein designates a film to be used for compensating for an optical characteristic of the display device.

According to the invention, in the foregoing arrangement, the display device takes an ECB system or a VA system.

The "ECB system" termed herein designates a system in which the axes of liquid crystal molecules are aligned substantially horizontally with respect to the first and the second substrates when no voltage is applied to the liquid crystal and rotating the liquid crystal molecules vertically with respect to the substrates when a certain voltage is applied thereto. The "VA system" termed herein designates a system in which the major axes of liquid crystal molecules forming the liquid crystal layer are aligned substantially vertically with respect to the first and the second substrates when no voltage is applied to the liquid crystal and the major axes thereof are rotated horizontally with respect to the substrates when a certain voltage is applied thereto.

Further, in the ECB system, the optical compensation film uses a polymer liquid crystal film formed of discotic liquid crystal. The alignment of the discotic liquid crystal molecules is inclined with respect to the film surface and is perpendicular to the initial alignment of the liquid crystal layer located on the side of the optical compensation film. Moreover, in the VA system, the optical compensation film is formed as a negative C plate.

The pixels are grouped into red, green and blue pixels. The phase difference of the in-cell retarder between the green pixels and the blue pixels is larger than that in the red pixels. Further, in this arrangement, the phase difference of the in-cell retarder in the blue pixels is larger than that in the green pixels.

In the arrangement in which the red, the green and the blue pixels have their respective phase differences, the phase difference of the in-cell retarder is adjusted to be a quarter or less of the wavelength at which the highest transmittance is brought about in each group of the red, the green and the blue pixels. Further, the in-cell retarder is formed with a half-tone mask or a gray-scale mask. The thickness of the in-cell retarder is uniform in the red, the green and the blue pixels and the birefringence of the in-cell retarder is different in each group of the red, the green and the blue pixels. Moreover, the planar phase difference among all the optical films located between the first polarization plate and the first substrate has a value of 50 nm or less. The planar phase difference among all the optical films located between the second polarization plate and the second plate has a value of 50 nm or less.

Further, the in-cell retarder is located only in the reflective area. In this location, the birefringence of the in-cell retarder is uniform in the red, the green and the blue pixels. The thickness of the in-cell retarder is different in each group of the red, the green and the blue pixels. Moreover, a step is formed to adjust the thickness of the in-cell retarder and the step causes the liquid crystal layer of the reflective area to be thinner than that of the transmissive area.

The transflective liquid crystal display device of each foregoing display system is arranged to reduce the coloring when displaying a reflected black image, offer a high contrast ratio, and to make its bulk thinner than the conventional liquid crystal display device.

BRIEF DESCRIPTION OF THE DRAWINGS

FIG. 11 is a chart showing a transmittance spectrum of general color filters;

FIGS. 12A to 12C are schematic views showing the method of producing an in-cell retarder having a different phase difference value in each color pixel;

DESCRIPTION OF THE EMBODIMENTS

Hereafter, the best modes of carrying out the invention will be described.

First Embodiment

The first embodiment will be described with reference to the appended drawings.

The first embodiment concerns with the transflective liquid crystal display (simply referred to as the transflective LCD) device of the ECB system. The ECB system transflective LCD device is arranged so that when applying no voltage the liquid crystal molecules are aligned horizontally with respect to the substrate but when applying a certain voltage the liquid crystal the liquid crystal molecules are rotated vertically with respect to the substrate. This ECB system transflective LCD uses an optical compensation film and includes a retarder plate built in a liquid crystal cell (simply referred to as an in-cell retarder as described above). In this embodiment, the in-cell retarder is used for arranging the transflective LCD, so that the ECB system transflective LCD of this embodiment may be made thinner in bulk than the conventional LCD.

Figure 1:
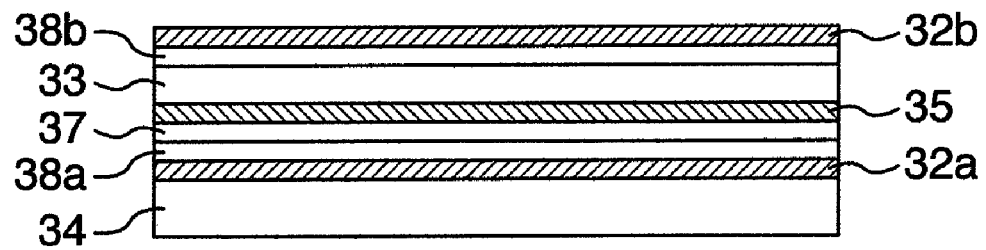
FIG. 1 is a schematic sectional view showing a liquid crystal display device according to a first embodiment of the present invention.

FIG. 1 shows a schematic section of the LCD device according to this embodiment. The LCD device includes a pair of polarization plates 32a, 32b, an optical compensation film 35, a liquid crystal cell 33, and a backlight unit 34.

The polarization plate 32a or 32b is formed by a PVA (Poly Vinyl Alcohol) layer extended with iodine absorbed thereon and a protective film for protecting the PVA layer.

Figure 2:
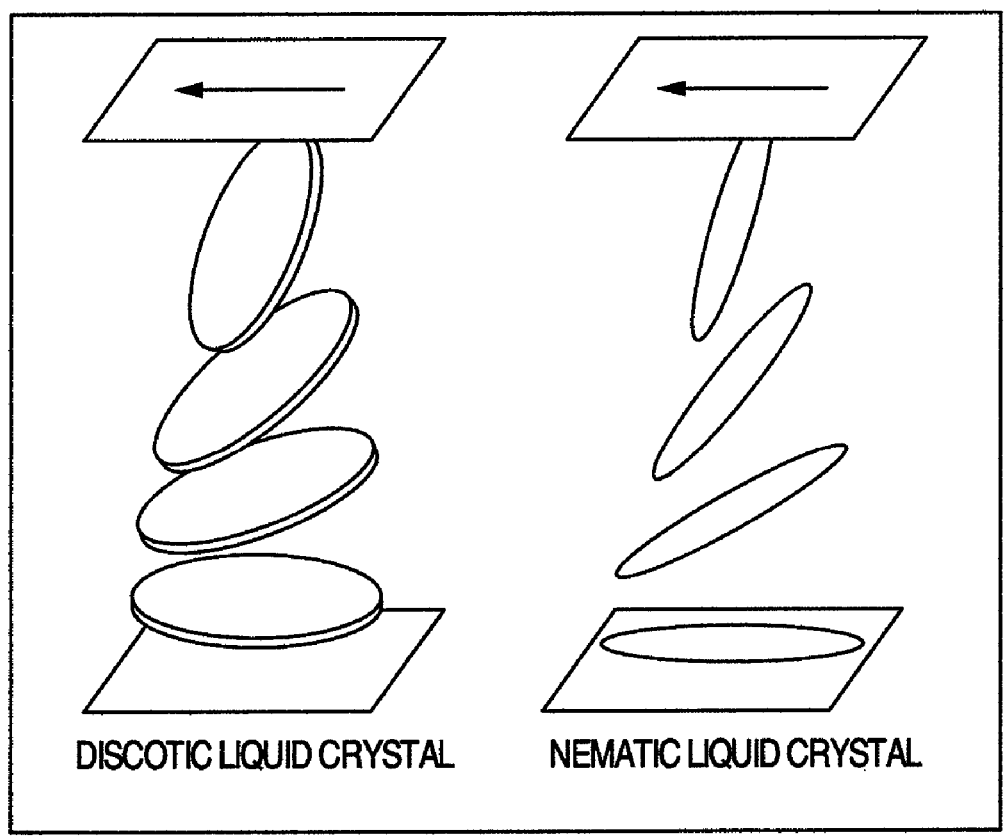
FIG. 2 is a sectional view showing an optical compensation film required in the first embodiment.

The optical compensation film 35 is a film for optically compensating for a visual angle. It is preferable to keep the refractive index distribution of the film 35 continuously changed with respect to the thickness of the film 35. Concretely, as shown in FIG. 2, on one of the substrates, the discotic liquid crystal molecules or the bar-like nematic liquid crystal molecules are aligned substantially horizontally with respect to the substrate. Preferably, those molecules are made erected toward the other substrate. In the composition of FIG. 1 is located one optical compensation film. Instead, the film may be located on each side of the liquid crystal cell.

An external retarder plate 37 (often referred simply to as an external retarder) is located so that the optical characteristic of the reflective portion is made substantially equal to that of the transmissive portion. The external retarder is requested to have a phase difference of about λ/4. The external retarder 37 is formed of polycarbonate or norbornene resin.

The retarders 38a and 38b are located so as to form a large-bandwidth circular polarization plate. Preferably, the retarders 38a and 38b are requested to have a phase difference of about λ/2 and are formed by polycarbonate or norbornene resin.

The backlight unit 34 is composed of an LED (Light-Emitting Diode) served as a light source, an optical waveguide, a diffuser and the like. Preferably, the LED is requested to have a white color. Instead, it is possible to use the LED of the three colors RGB. The backlight unit 34 may be any device if it serves to illuminate the liquid crystal cell 33 from the rear surface. The light source and the structure of the backlight unit 34 are not limited to those shown in FIG. 1. For example, the use of a CCFL as the light source makes it possible to achieve the effect of the present invention.

Figure 3:
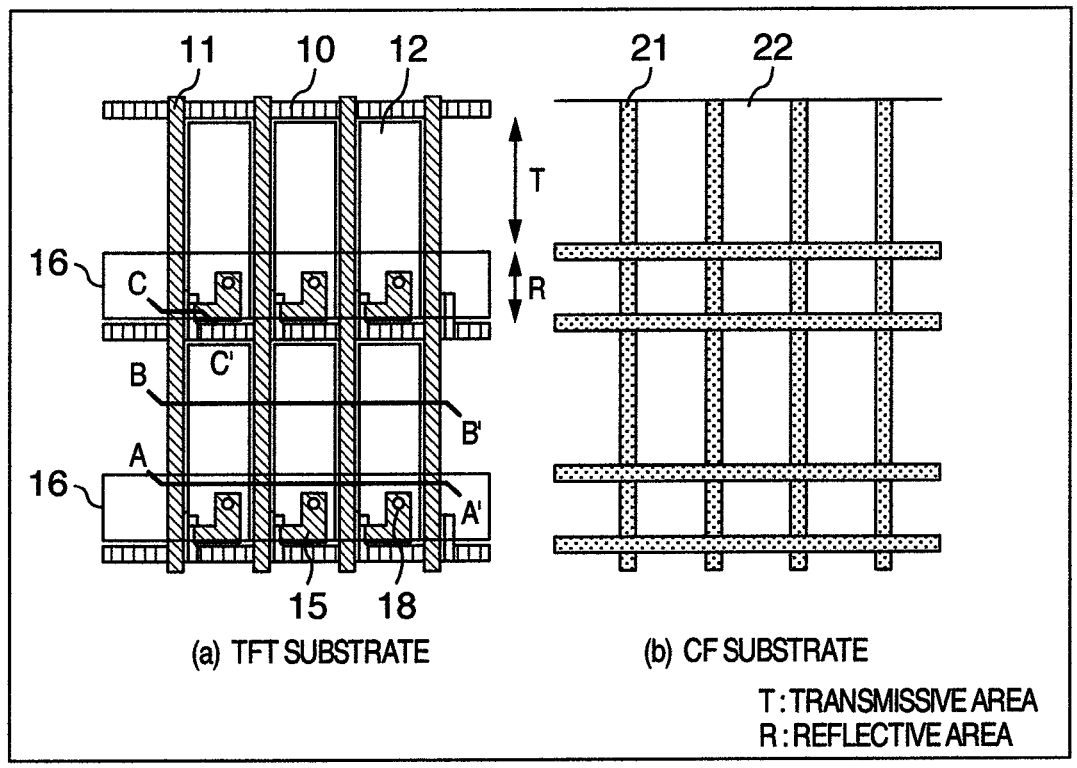
FIG. 3 is a sectional view showing a planar structure of a liquid crystal cell according to in the first embodiment.

FIG. 3 shows a section of a planar structure of the liquid crystal cell 33. Part (a) of FIG. 3 shows a TFT (Thin-Film Transistor) substrate side, while part (b) of FIG. 3 shows a CF substrate side.

On the TFT substrate side, a pixel electrode 12 is located within an area enclosed by scan lines 10 and signal lines 11. A reflective electrode 16 is located so as to form a transmissive area (designated by an arrow T) and a reflective area (designated by an arrow R) on the pixel area. Further, in each pixel is located a TFT for controlling a voltage to be applied to each pixel. To contact a source electrode 15 with the pixel electrode 12 in the TFT, a contact hole 18 is formed. On the other hand, on the CF substrate are located a back matrix 21 and a common electrode 22.

Figure 4:
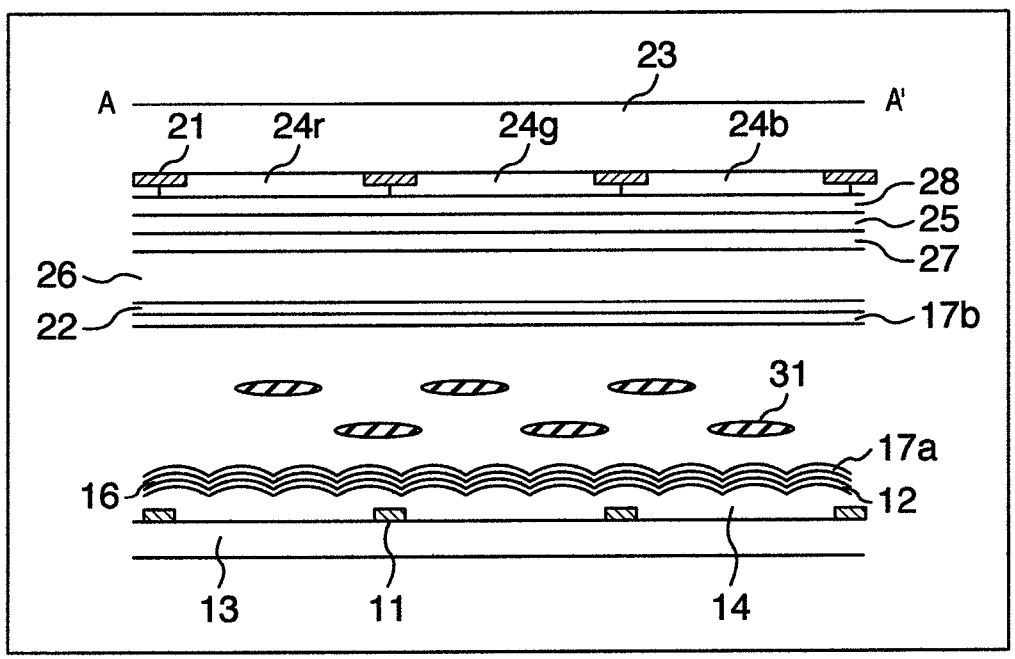
FIG. 4 is a schematic sectional view cut on the A-A' line shown in FIG. 3.
Figure 5:
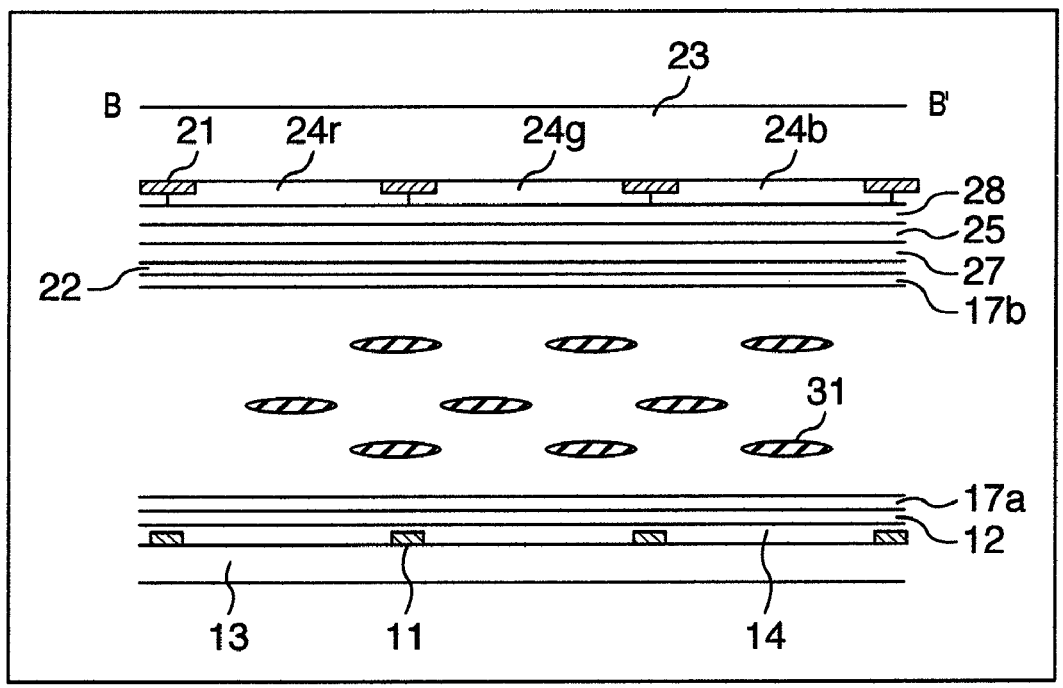
FIG. 5 is a schematic sectional view cut on the B-B' line shown in FIG. 3.

FIGS. 4 and 5 are schematic sections cut on the A-A' and the B-B' of FIG. 3A. The liquid crystal cell 33 is composed by a liquid crystal layer 31 laid between the first substrate 13 and the second substrate 23.

The liquid crystal layer 31 is formed by a liquid crystal composition with a positive dielectric anisotropy in which a dielectric constant toward the major axes of the liquid crystal molecules is larger than a dielectric constant toward the minor axes thereof. The liquid crystal layer 31 is formed by a liquid crystal material that stays in the nematic phase in a wide range of temperatures including a room temperature. The liquid crystal alignment should be the homogeneous alignment. Further, it is preferable to use the liquid crystal layer that keeps the transmittance during the holding period and shows so high an electric resistivity as causing no flicker in the driving condition in the use of the TFT such as in the condition that the resolution is QVGA (the number of the lines being 240) and the driving frequency is 60 Hz. That is, the electric resistivity of the liquid crystal layer 31 is requested to have a value of $10^{12}$ $\Omega cm^2$ or more, in particular, $10^{13}$ $\Omega cm^2$ or more.

On the top surface on the liquid crystal layer side of the first substrate 13, an alignment film 17a and the pixel electrode 12 are located in this describing sequence. On the reflective portion, the reflective electrode 16 is located between the alignment film 17a and the pixel electrode 12. The reflective electrode 16 may be located under the pixel electrode 12. When the reflective electrode 16 is located on the side of the liquid crystal layer with respect to the pixel electrode 12, the reflective electrode 16 shows a higher reflectance. On the first substrate 13 are located the signal line 11 and an insulating film 14.

On the liquid crystal side of the second substrate 23 are located red color filters 24a, green color filters 24b and blue color filters 24c. A black matrix 21 is located between the pixels or between the transmissive portion and the reflective portion. On the liquid crystal layer side of the color filters 24 are located a leveling layer 28, an in-cell retarder 25, a protective film 27, and further a common electrode 22.

Further, in the reflective portion, a step portion 26 is located between the common electrode 22 and the protective film 27. An alignment film 17b is located on the liquid crystal side of the common electrode 22.

The first and the second substrates 13 and 23 are transparent so that light may be transmitted therethrough. For example, the first and the second substrates 13 and 23 may be formed by a glass or polymer film. Preferably, the polymer film may be formed by plastic or polyether sulphone (referred to as the PES). However, a gas barrier is requested to be formed on the surface of the substrate because air is allowed to pass through the plastic or the PES. The gas barrier is requested to be formed by silicon nitride.

The alignment film 17 has a function of horizontally aligning the liquid crystal molecules on the surface of the substrate. It is preferable to use a polyimide system organic film as the alignment film 17.

Figure 6:
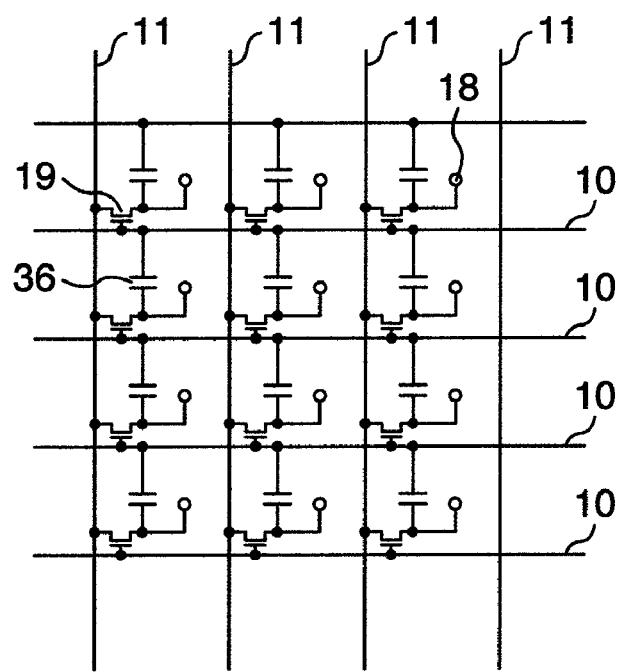
FIG. 6 is a circuit diagram showing equivalent circuits located in matrix so that those equivalent circuits may compose a pixel display area included in the first embodiment.
Figure 7:
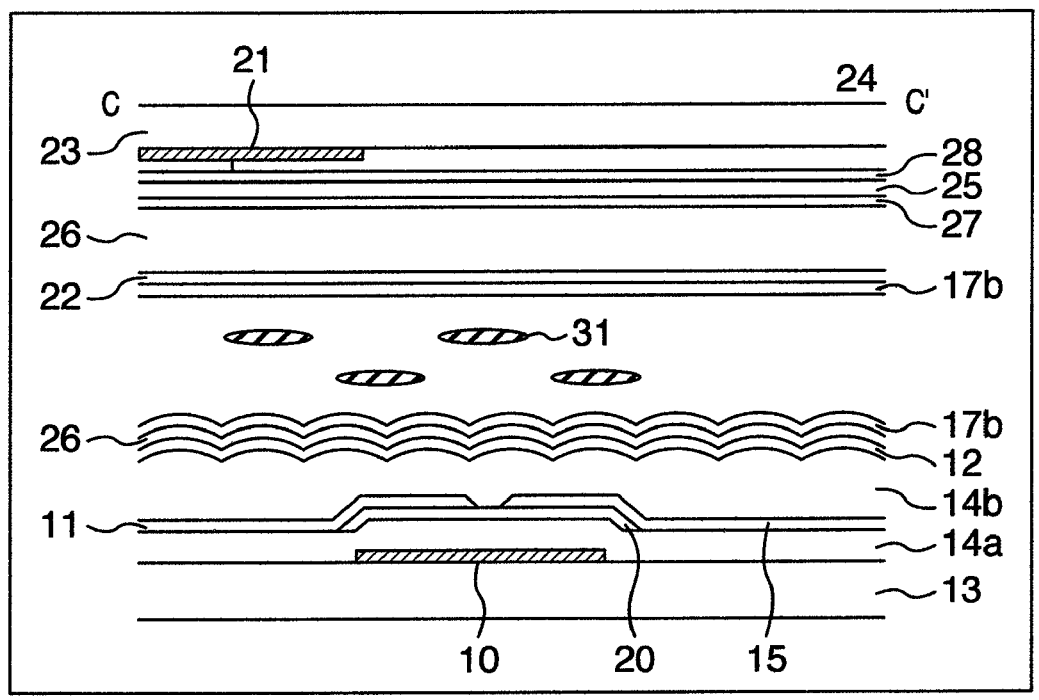
FIG. 7 is a schematic sectional view cut on the C-C' line shown in FIG. 3.

FIG. 6 shows an equivalent circuit of the pixels composing a display area and located in a matrix manner. FIG. 7 shows a schematic section on the C-C' of FIG. 3.

In FIG. 6, the pixel area includes the signal lines 11 and the scan lines 10. The area enclosed by the signal line 11 and the scan line 10 corresponds to the pixel. The signal line is located substantially perpendicularly to the scan line. The crossing point therebetween has at least one TFT 19. The TFT 19 is connected with the contact hole 18, which is connected with the pixel electrode 12 though not shown in FIG. 4. Further, at least one storage capacitor is located for one pixel so as to prevent the held image signal from being leaked out.

Herein, the description has been expanded with an example of the active matrix drive in which one TFT 19 is located for one pixel. This embodiment may achieve the same effect if it is applied to the passive matrix drive. The TFT 19 takes an inversely staggered structure each channel portion of which has the storage capacitor 36.

In FIG. 7, a voltage signal for controlling the liquid crystal layer 31 is applied onto the signal line 11. A signal for controlling the TFT 19 is applied onto the scan line 10. The source electrode 15 is connected with the scan electrode 12 through the contact hole 18. It is preferable to make the signal line 11, the scan line 10 and the source electrode 15 of a low-resistive conductive material. For example, the material may be chrome, tantalum molybdic, tantalum, aluminum, copper, or the like.

The pixel electrode 12 is located so as to apply an electric field onto the liquid crystal layer 31. The pixel electrode 12 is made of a transparent conductive material. For example, the material may be indium-tin oxide (ITO) or zinc oxide (ZnO).

The reflective electrode 16 is located so as to reflect the ambient light incident from the side of the second substrate 23. The reflective electrode 16 has an uneven surface in order to diffuse the incident ambient light. Though this uneven surface may be formed on only the reflective electrode 16, in this embodiment, as shown in FIG. 1, the uneven surface is formed on the insulating film 14a and the insulating film 14a is pasted on the reflective electrode 16. This pasting results in making the surface of the reflective electrode 16 uneven. Further, the reflective electrode 16 is connected with the pixel electrode 12 so as to keep the reflective electrode 16 at the same electric potential as the transmissive area. Hence, the reflective electrode 16 is served as an pixel electrode of the transmissive area. The reflective electrode 16 is formed of highly conductive metal. In particular, it is preferable to make the reflective electrode 16 of silver or aluminum because the metal has a high reflectance in a visible area and a high conductivity.

The color filter 24 is an array of a red area, a green area and a blue area through which red light, green light and blue light may be passed in each pixel respectively. For example, this kind of array may be a stripe array, a delta array, or the like.

The black matrix 21 is located so as to cut off light leaked out of the adjacent pixel and a tapered portion of the step 26 located in the reflective portion. The black matrix 21 is made of opaque metal such as chrome, tantalum molybdic, tantalum, aluminum or copper.

The leveling layer 28 is located so as to level an uneven surface caused in producing the color filter. It is preferable to form the leveling layer 28 of acrylic resin or the like.

The in-cell retarder is located so as to make the optical characteristic of the reflected display closer to that of the transmissive display. The in-cell retarder 25 is made of liquid crystal polymer. Hence, the in-cell retarder 25 is higher in a molecular alignment characteristic than the retarder made by extending an organic polymer film and thus has the substantially same molecular alignment characteristic as the liquid crystal layer 31. Therefore, the in-cell retarder 25 has a far larger Δn than the outside retarder. It means that by properly adjusting the molecular structure and the manufacturing condition, it is possible to make Δn of the in-cell retarder 25 larger than or equal to that of the liquid crystal layer 31. The thickness of the outside retarder is as long as several tens μm, which is ten times as long as the thickness of the liquid crystal layer. However, the use of the liquid crystal polymer molecules makes it possible to greatly reduce the thickness of the in-cell retarder 25. As compared with the conventional arrangement provided with the outside retarder, it is possible to greatly reduce the thickness of the overall liquid crystal panel.

The in-cell retarder 25 is served to rub the substrate on which an alignment film is coated. The diacrylic liquid crystal mixture, dissolved in an organic solvent with a photo initiator, is coated on the in-cell retarder 25 by means of the spin coat, the print, or the like. Immediately after the coating, the mixture is in liquid solution. Then, as the solvent is being evaporated, the mixture is aligned in the alignment direction of the retardation alignment film. By radiating a ultraviolet ray to the coat, acrylic groups of the molecule ends are polymerized. In this reaction, oxygen is an inhibitive factor to the polymerization. However, a sufficient density of the light reaction starting agent makes the light reaction progressed at a proper speed. If the in-cell retarder is required to be patterned, the portions to be patterned are hidden from the ultraviolet radiation with a mask or the like and then developed by means of an organic solvent so that the in-cell retarders may be located only on the necessary portions. The foregoing process results in making it possible to solidify the coat as roughly keeping the alignment of the liquid crystal layer and thereby form the retardation layer. Afterwards, the retardation layer is heated in each step of the process of forming the alignment film. Since the retardation layer stays at a high temperature, the retardation value is reduced. The current retardation value is substantially proportional to the length of time when the retardation layer stays at a high temperature if the high temperature is constant. Hence, the initial retardation value may be set in consideration of this phenomenon. It is preferable to make the retardation value of the in-cell retarder used in this embodiment smaller than λ/4. This is because the phase different left in the liquid crystal is required to be considered when displaying a black image.

The protective film 27 is located so as to protect the liquid crystal layer 31 so that the in-cell retarder 25 is not leaked into the liquid crystal layer 31. Like the leveling layer 28, it is preferable to make the protective film 27 of acrylic resin or the like.

The common electrode 22 is made of a transparent conductive material. For example, the material may be ITO (Indium Tin Oxide) or ZnO (Zn Oxide).

The step 26 is located so as to make the optical response of the transmissive portion substantially equal to that of the reflective portion. Preferably, the step 26 is made of a resist material or the like.

As to the foregoing description of the first embodiment, the axial locations of the polarization plate, the retarder, and the liquid crystal alignment and the phase difference values in the locations are listed in Table 1 according to the first embodiment A.

TABLE 1

| | Prior Art | First Embodiment A | First Embodiment B | Second Embodiment |
|---|---|---|---|---|
| Polarization Plate | 15° | 15° | 45° | 45° |
| Retarder | 30° | 30° | — | — |
| Outside Retarder | 90° | — | — | — |
| In-cell Retarder | — | 90° | 90° | 90° |
| Liquid Crystal | 90° | 90° | 90° | 90° |
| Optical Compensation Film | 270° | 270° | 270° | 270° |
| Outside Retarder | 90° | 90° | — | — |
| Retarder | 155° | 155° | — | — |
| Polarization Plate | 85° | 85° | −45° | −45° |

TABLE 1B

| | Prior Art | First Embodiment A | First Embodiment B | Second Embodiment |
|---|---|---|---|---|
| Polarization Plate | — | — | — | — |
| Retarder | 270 | 270 | — | — |
| Outside Retarder | 108 | — | — | — |
| In-cell Retarder | — | 110 | 100 | Per Pixel |
| Liquid Crystal | 280 | 280 | 280 | 280 |
| Optical Compensation Film | −30 | −30 | −30 | −30 |
| Outside Retarder | 150 | 150 | — | — |
| Retarder | 270 | 270 | — | — |
| Polarization Plate | — | — | — | — |

* The unit is (nm).

Table 1A lists the axial locations and Table 1B lists the phase difference values. The axial locations should follow the values listed in Table 1A. However, they are not limited to those values.

In this embodiment, the retarder of the transflective ECB-LCD is built in the liquid crystal cell, though it is connected outside in the prior art. Further, the optical compensation film is used in this embodiment. The use of the in-cell retarder and the optical compensation film makes the transflective ECB-LCD device thinner than the conventional one.

Further, by patterning the in-cell retarder of the transmissive portion and removing the outside retarder 37 and the retardations 38a and 38b shown in FIG. 1, it is possible to make the overall LCD device thinner and enhance the transmissive contrast ratio. This composition will be described with reference to FIGS. 8 and 9.

Figure 8:
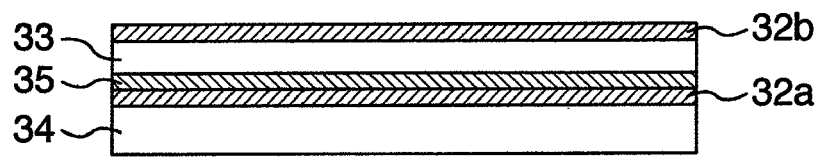
FIG. 8 is a schematic sectional view showing a liquid crystal display device according to a first embodiment 1B of the present invention.
Figure 9:
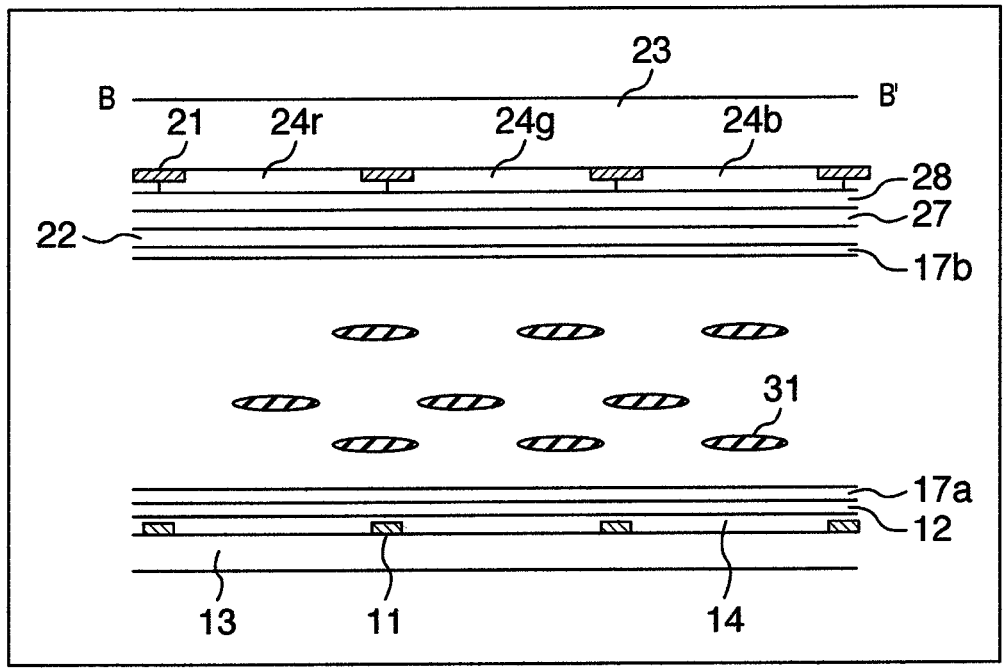
FIG. 9 is a schematic sectional view cut on the B-B' line shown in FIG. 3 according to the first embodiment 1B.

FIG. 8 shows a schematic section of the LCD device according to this embodiment. FIG. 9 shows a schematic section of the transmissive portion. The schematic section of the reflective portion is the same as that shown in FIG. 4, and thus the description thereabout is left out.

The method of patterning the in-cell retarder has been described above. As another method, when the diacrylic liquid crystal mixture is coated on the in-cell retarder, the retarder is heated so that it may be an isotropic layer. In this state, a ray of light is radiated to only the portions to be patterned. The portions to which a ray is radiated are solidified as the isotropic layer. Hence, the phase difference value is made substantially zero, so that those portions have the same effective characteristics as the layer formed by the foregoing patterning method.

Unlike the composition shown in FIG. 1, the outside retarder 37 and the retarders 38*a* and 38*b* are removed. As shown in FIG. 8, the LCD is composed of the liquid crystal cell 33, the pair of polarization plates 32*a*, 32*b*, the optical compensation film 35, and the backlight unit 34. Further, as shown in FIG. 9, the in-cell retarder is not located in the transmissive portion.

In turn, the description will be oriented to the condition on which the LCD device performs a contrasting display when the in-cell retarder is patterned. The axial locations of the polarization plates, the retarder and the liquid crystal are listed in the Table 1 according to the embodiment 1B. As is understood from the Table 1, on the transmissive portion, the retarder except the optical compensation film is not located. In this embodiment is used the optical compensation film as shown in FIG. 2. The optical compensation film as shown in FIG. 2 brings about a quite slight planar phase difference when observed in the normal direction of the substrate. For example, as to the film as shown in FIG. 2A, in general, the film has a planar phase difference of 20 to 30 nm. Further, the liquid crystal layer 31 has a phase difference of about $\lambda/2$ when no voltage is applied to the liquid crystal and has only the phase difference left on the surface of the substrate when a far higher voltage than the threshold value is applied thereto. (Hereafter, this phase difference is called the residual phase difference.) The axis called a stamp axis shown in FIG. 2A is located in parallel to the liquid crystal alignment axis. Hence, a slow axis of the front phase difference of the optical compensation film is located perpendicularly to the slow axis of the residual phase difference when a certain voltage is applied to the liquid crystal. Hence, by applying a voltage to the liquid crystal so that these two phase differences are made equal to each other, the phase differences are offset with each other and thus the complete black image can be achieved.

Further, the optimal in-cell retarder has respective optimal values. This is because as to the conventional method and the method of the first embodiment A, the retarder is used for keeping the transmission and the reflection compatible with each other, while as to the embodiment 1B, what is to be considered is the reflective portion only.

In this embodiment, since the outside retarder 37 of the transmissive portion and the retarder 38 are removed, the overall LCD device is made thinner. Further, since the in-cell retarder 25 is removed from the transmissive portion, the reduction of a contrast ratio caused by an axial shift or variable phase differences is avoided. Hence, the transmissive contrast ratio may be improved.

Second Embodiment

In turn, the description will be oriented to the LCD device according to another embodiment.

The second embodiment concerns with the transflective ECB-LCD device that uses the in-cell retarder and thus is not required to have the outside retarder, in which device as to the phase difference values of the retarder built in the reflective portion, the values of the blue and the green are equal to each other but the value of the red is different therefrom or the values of the blue, the green and the red are different from one another. Further, the phase difference values of the retarders built in the color pixels do not have the relation of $\lambda/4$. The second embodiment makes it possible to improve the reflected color when displaying a black image and to improve the reflective contrast ratio.

Figure 10:
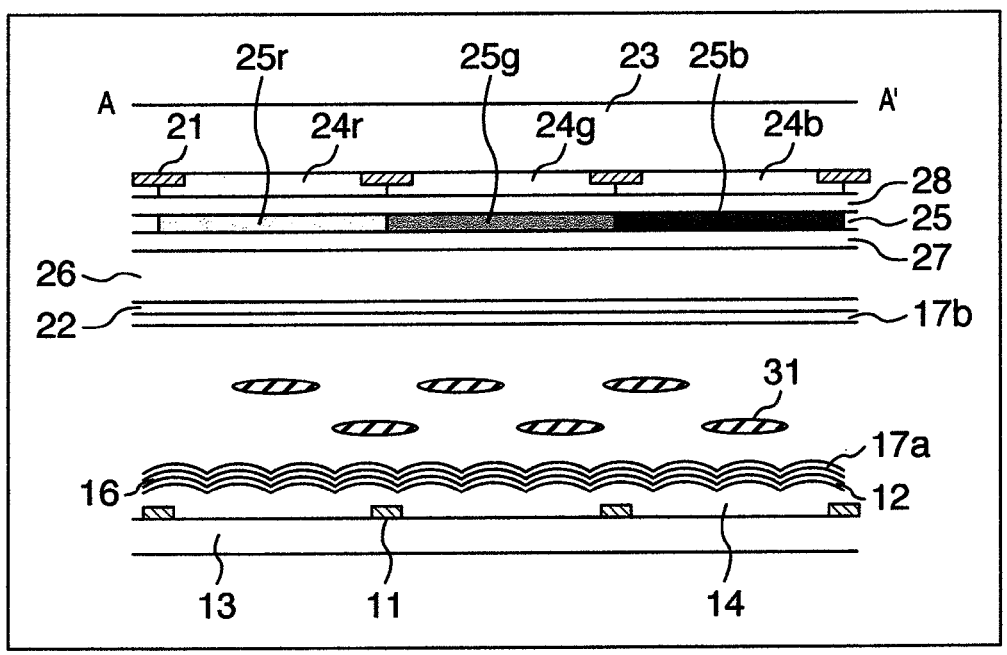
FIG. 10 is a schematic sectional view cut on the B-B' line shown in FIG. 3 according to a second embodiment of the present invention.

The sectional structure of the LCD device according to the second embodiment is the same as that shown in FIG. 8. The schematic sectional structure of the transmissive portion is the same as that shown in FIG. 9. The different respect between the first embodiment and the second one will be described with reference to FIG. 10. FIG. 10 shows a schematic section of the reflective portion, which corresponds with the composition shown in FIG. 4 according to the first embodiment. The composition shown in FIG. 10 is different from that shown in FIG. 4 in a respect that an in-cell retarder 25*r* located on a red pixel area (at a location corresponding with the red color filter 24*r*), an in-cell retarder 25*g* located on a green pixel area (at a location corresponding with the green color filter 24*g*), and an in-cell retarder 25*b* located on a blue pixel area (at a location corresponding with the blue color filter 24*b*) have their respective phase difference values.

In general, the color filter to be used for the transflective LCD often provides a hole formed therein if the color filter belongs to the reflective portion. This hole is formed to enhance the reflectance. This hole is served to lower the color reproducibility of the reflective portion but enhance the reflectance. However, since the present embodiment is arranged to make the phase difference value of the in-cell retarder for each color pixel optimal, the use of the color filter with the hole opened therein makes it possible to lower the display quality when displaying a black image. Hence, as to the red color filter 24*r*, the green color filter 24*g* and the blue color filter 24*b* used in this embodiment, to enhance the reflectance as obtaining an excellent black image, it is preferable not to form a hole in the reflective portion. However, if the same color filter as the color filter of the transmissive portion with a high color reproducibility is used for the reflective portion, it is not possible to obtain a sufficiently high reflectance. In order to solve this problem, therefore, it is necessary to make the thickness of the color filter of the reflective portion different from that of the transmissive portion. That is, The color filter of the reflective portion is required to be thinner than that of the transmissive portion.

Conventionally, when the outside retarder is used, for example, if a $\lambda/4$ plate is located, it has been impossible to meet the condition of $\lambda/4$ as to all the RGB pixels. Hence, by independently controlling the phase difference values of two or all of the RGB pixels, it is possible to meet the ideal condition as to two or all of the color pixels. The axial locations and the phase difference values of the retarder plate are listed in the second embodiment of Table 1. Herein, to optimize two of the RGB pixels, it is preferable to make the green pixels equal to the blue pixels and optimize the red pixels only. The grounds will be described below with reference to FIG. 11.

FIG. 11 shows the transmission spectrums of the general color filters. In the chart of FIG. 11, an axis of ordinate denotes a transmittance and an axis of abscissas denotes a wavelength, and the spectrums for the red, the green and the blue are depicted. As is understood from FIG. 11, the blue color filter has a peak around 450 nm, while the red color filter passes almost of the light of 600 nm or more therethrough. Hence, it is presumed that the red color filter has a greater light leakage with the standard of the green pixel. It means that it is preferable to independently control the phase difference value of the red pixel.

To make sure of the effect of this embodiment, the reflective characteristic was theoretically measured. Letting $\Delta n$ of the liquid crystal be 0.07 and $\Delta \in$ be 7, it was designed that the phase difference of the liquid crystal was about 140 nm when no voltage is applied. ($\Delta n=0.07$ (for the wavelength of 550 nm) and a cell gap is 2.0 µm.) In this condition, considering the phase difference value of the in-cell retarder of each color pixel, it is preferable that $R_{IN-R}$ is about 136 nm for the wavelength of 650 nm and $R_{IN-G}$ and $R_{IN-B}$ are about 112 nm for the wavelength of 550 nm. If the blue pixel is independently controlled, it is preferable that $R_{IN-B}$ is about 95 nm for the wavelength of 450 nm. Herein, $R_{IN-R}$, $R_{IN-G}$ and $R_{IN-B}$ denote the phase difference values of the in-cell retarders 25 located for the red, the green and the blue pixels respectively. These values are not $\lambda/4$ for each wavelength. In this condition, the reflecting contrast ratio was calculated. As compared with the condition of the embodiment 1B, for optimizing two pixels, the reflecting contrast ratio was improved double and for optimizing three pixels, the reflecting contrast ratio was improved quadruple.

The method for forming the in-cell retarder to be used in this embodiment will be described with reference to FIGS. 12A to 12C. Since FIGS. 12A to 12C are the explanatory views of the method of forming the in-cell retarder 25 on the second substrate 23, the color filter 24 and the like are not shown therein. At first, an alignment film 39 for the in-cell retarder is coated and rubbed on the second substrate 23. This alignment film 39 is used for aligning the diacrylic liquid crystal mixture on which the retarder is formed. On the coated film 39, the diacrylic liquid crystal mixture is coated by means of the spin-coating or the printing means as shown in FIG. 12A. Immediately after the mixture is coated, the mixture stays in the solution state. The mixture is aligned in the aligning direction of the alignment film 39 as evaporating the solvent. By radiating a ultraviolet ray to the film-coated substrate, the acrylic groups of the ends of the molecules are polymerized. When radiating the ray, with a halftone mask or a grayscale mask or as changing the light intensity according to a portion, the radiating intensity of the ultraviolet ray is changed according to a portion as shown in FIG. 12B. As a result, in the portion where the ray is radiated at a high intensity, the liquid crystal molecules are completely coupled, while in the portion where the ray is radiated at a relatively low intensity, the liquid crystal molecules may not be coupled. Since a certain degree of coupling is executed over the surface, all of the portions are left in the organic development. However, after being heated, the aligning state of the portion where the radiation is low is more scattered than the aligning state of the portion where the radiation is high as shown in FIG. 12C because the coupling of the acrylic groups in the former portion is incomplete. As such, by changing the radiation intensity, it is possible to control the birefringence of the in-cell retarder and thus to control the phase difference value for each color pixel. This method does not need the heat process when radiating the ray and needs only one radiation. Hence, the steps of the process are not increased more. Further, the retardation layer is formed to keep its thickness constant.

As described above, the arrangement of this embodiment makes it possible to enhance the reflecting contrast ratio though the outside retarder is not used and to thin the overall structure more. Further, since the retarder is not located in the transmissive portion, it is possible to prevent the lowering of the transmissive contrast ratio caused by the retarder-based factors such as axial shift or a variety of phase difference values. Further, with the halftone mask or the grayscale mask, the phase difference value can be controlled without having to increase the steps of the process in number and form the step in the retarder.

Further, when forming the in-cell retarder, the selective use of a material therefore makes it possible to continuously change the refractive index distribution of the retarder in the thickness direction of the retarder. As this result, the optical characteristic of the reflected light can be improved. At this time, the front phase difference of the in-cell retarder 25 is different in each color pixel. Further, in FIG. 13, the liquid crystal is shown as bar-like nematic liquid crystal. Instead, it may take the form of the discotic liquid crystal.

Figure 13:
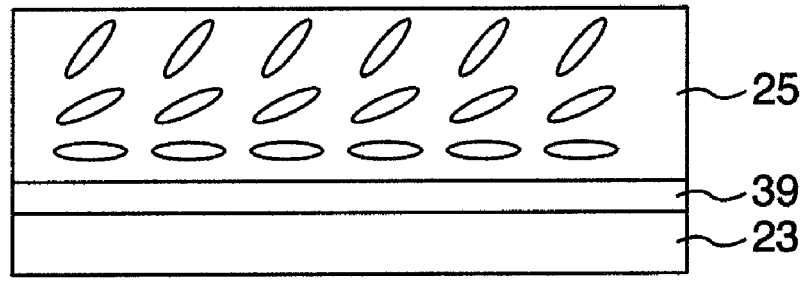
FIG. 13 is a schematic sectional view showing an optically compensable in-cell retarder according to the second embodiment.

The retarder shown in FIG. 13 may be formed by using such a material as aligning the liquid crystal molecules on the air interface.

Third Embodiment

In turn, the description will be oriented to the LCD device according to another embodiment of the present invention.

This embodiment is arranged to control the phase difference value of the in-cell retarder based on not the birefringence but the thickness. This embodiment arranged to execute the thickness-based control offers the same effect as the second embodiment.

Figure 14:
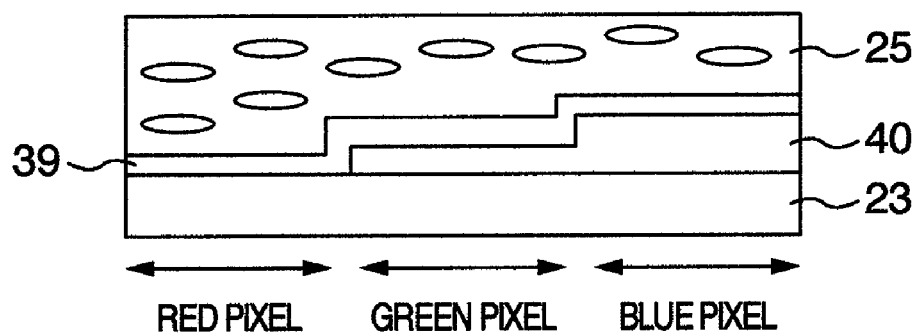
FIG. 14 is a schematic sectional view showing a second substrate according to a third embodiment of the present invention.

The different respect between this third embodiment and the second embodiment will be described below with reference to FIG. 14. FIG. 14 is a section showing the second substrate 23 to be used for the third embodiment. Since FIG. 14 is an explanatory view of the form of the in-cell retarder 25, the color filter 24 and the like are not shown therein. The step 40 used for the in-cell retarder is located on the second substrate 23 so as to properly adjust the thickness of the in-cell retarder 25.

It is preferable that the step 40 is formed by an organic insulating film, for example. To form the step, the etching may be carried out by radiating a ray to the coated film with the proper portions being hidden by the grayscale mask or the halftone mask. Or, the other etching may be carried out by radiating a ray to the portions to be etched. Further, the step 40 may be served as the step 26.

As described above, like the second embodiment, the arrangement of the third embodiment makes it possible to enhance the reflecting contrast ratio though the outside retarder is not used and to thin the overall structure more.

Fourth Embodiment

In turn, the description will be oriented to the LCD device according to another embodiment of the invention.

The fourth embodiment concerns with the VA system transflective LCD device arranged so that the liquid crystal molecules are aligned vertically with respect to the substrate when no voltage is applied to the liquid crystal and rotated horizontally with respect to the substrate when a certain voltage is applied thereto. This VA system transflective LCD device uses the optical compensation film and includes the retarder built inside the liquid crystal cell. This embodiment is arranged to build the retarder in the transflective VA-LCD. Hence, the structure of this embodiment is made thinner than that of the prior art.

Figure 15:
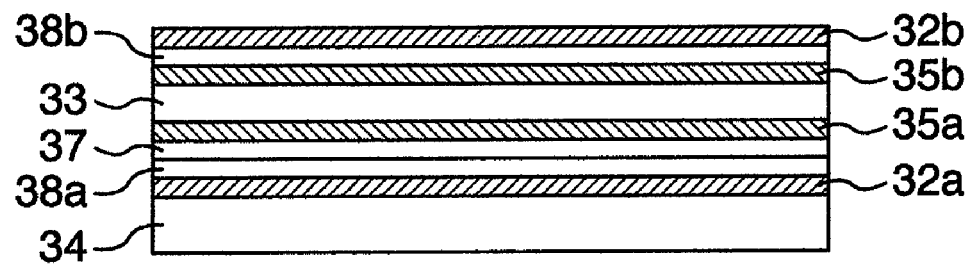
FIG. 15 is a schematic sectional view showing a liquid crystal display device according to a fourth embodiment of the present invention.

The different respect between this embodiment and the first embodiment will be described below with reference to FIGS. 15 to 19. FIG. 15 shows a schematic section of the LCD device according to this fourth embodiment. The LCD device includes a pair of polarization plates 32a and 32b, a pair of optical compensation films 35a and 35b, a liquid crystal cell 33, and a backlight unit 34.

The optical compensation films 35a and 35b are served as the films for optically compensating for a visual angle. These films are located so as to reduce light leakage caused when observing a black image on the display in the oblique direction. It is preferable that the optical compensation films 35a and 35b are formed as negative C plates each having a substantially isotropic refractive index on the plane and a smaller refractive index in the thickness direction than the refractive index on the plane. The material of the optical compensation film 35 may be a polycarbonate, polyolefin, polystyrene, polyester cellulose, or a cellulose acylate family such as cellulose acetate or cellulose acetate butyrate. From a total view point, it is preferable to use the cellulose acylate family, in particular, the cellulose acetate, for the material of the film 35. The films 35a and 35b located vertically have the substantially same retarder $R_{th}$ in the thickness direction. The retarder $R_{th}$ should be about 100 nm. The retarder $R_{th}$ is defined by the following expression (1);

[Expression 1]

$$Rth = \left(\frac{n_x + n_y}{2} - n_z\right) \cdot d \tag{1}$$

wherein $n_x$, $n_y$ and $n_z$ denote refractive indexes on the major axis of the refractive ellipsoid, in particular, $n_x$ and $n_y$ denote refractive indexes on the plane and $n_z$ denotes a refractive index in the thickness direction, and d denotes a thickness of the retarder (herein, the negative C plate).

Figure 16:
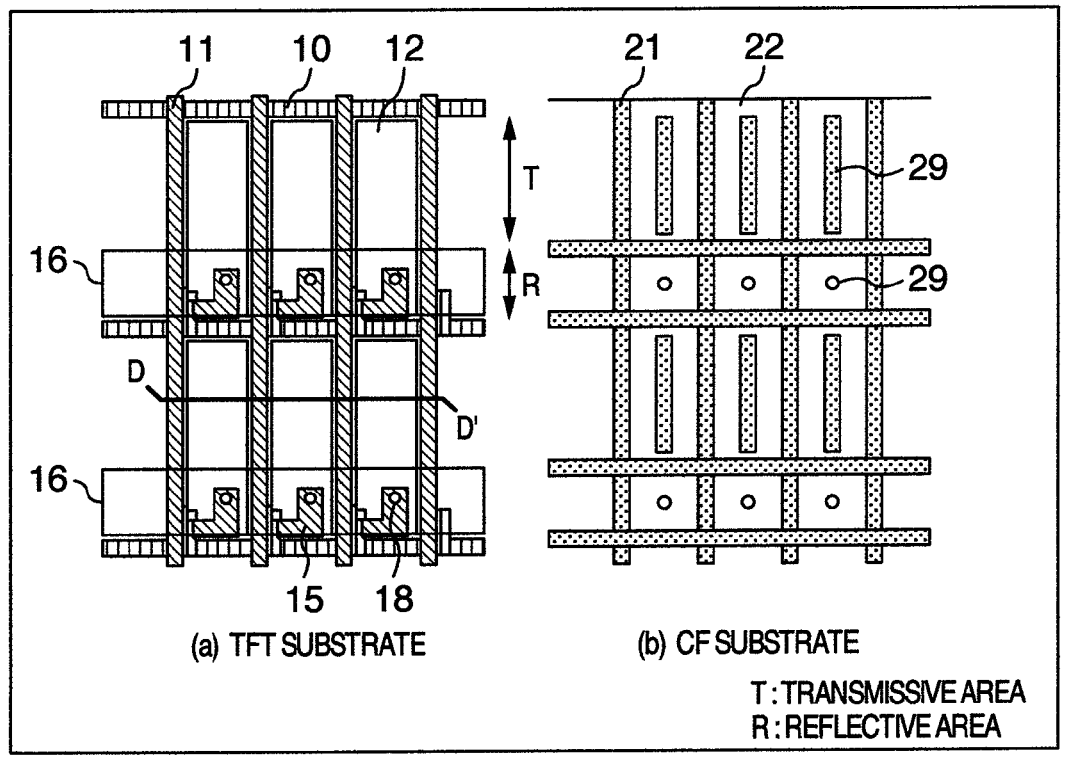
FIG. 16 is a sectional view showing a planar structure of a liquid crystal cell according to in the fourth embodiment.
Figure 17:
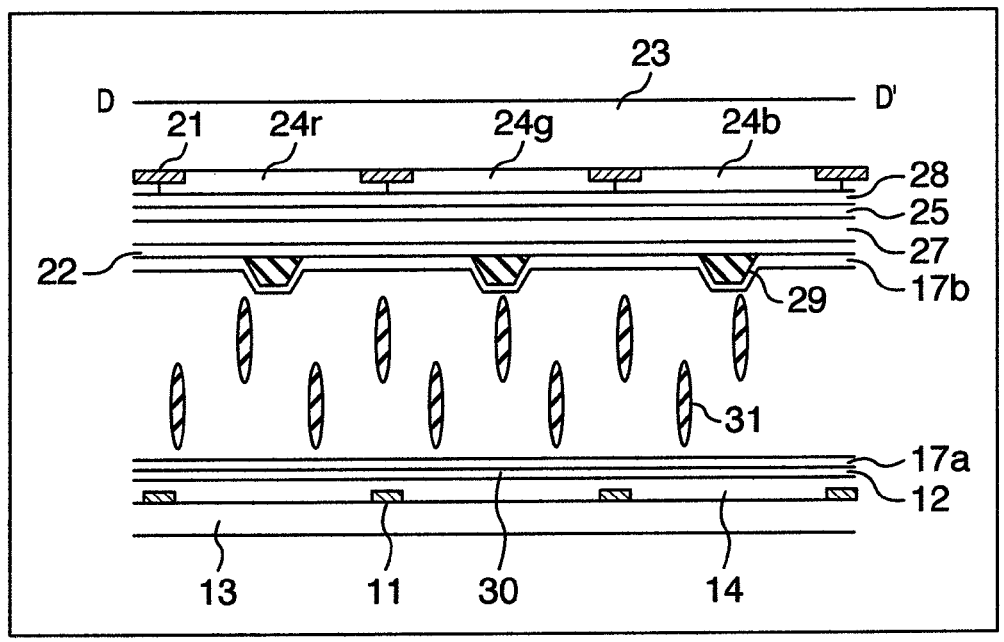
FIG. 17 is a schematic sectional view cut on the D-D' line shown in FIG. 14.
Figure 18:
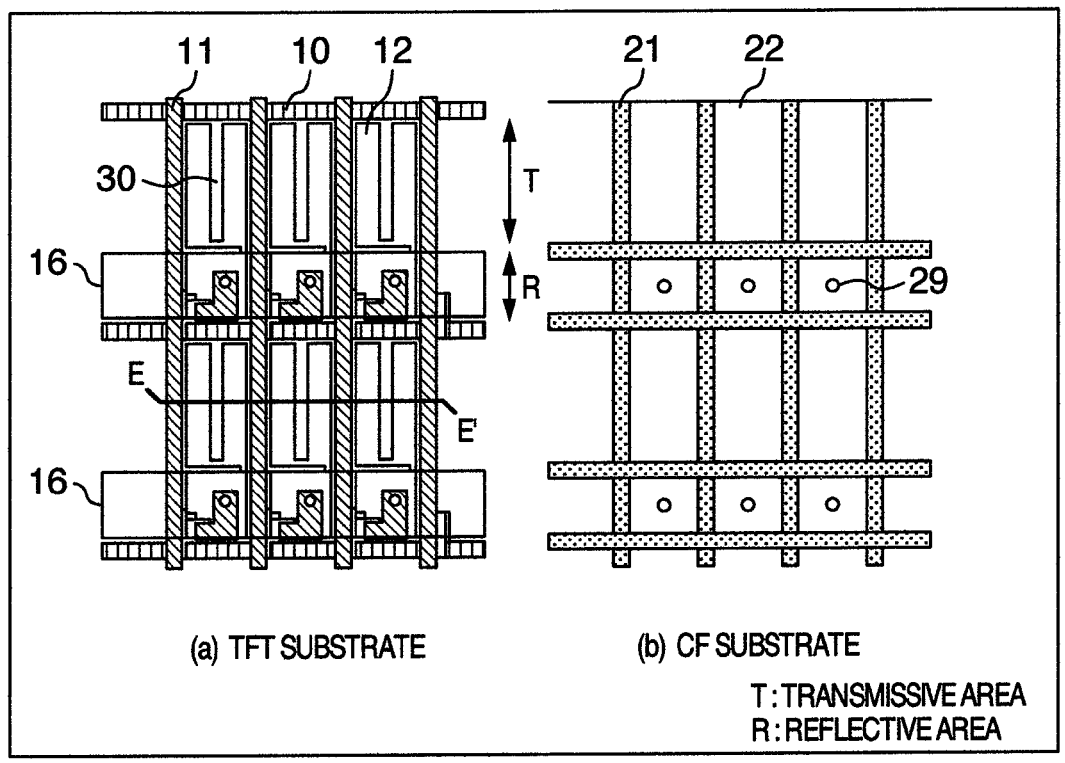
FIG. 18 is a sectional view showing a planar structure of the liquid crystal cell provided with slits according to the fourth embodiment.
Figure 19:
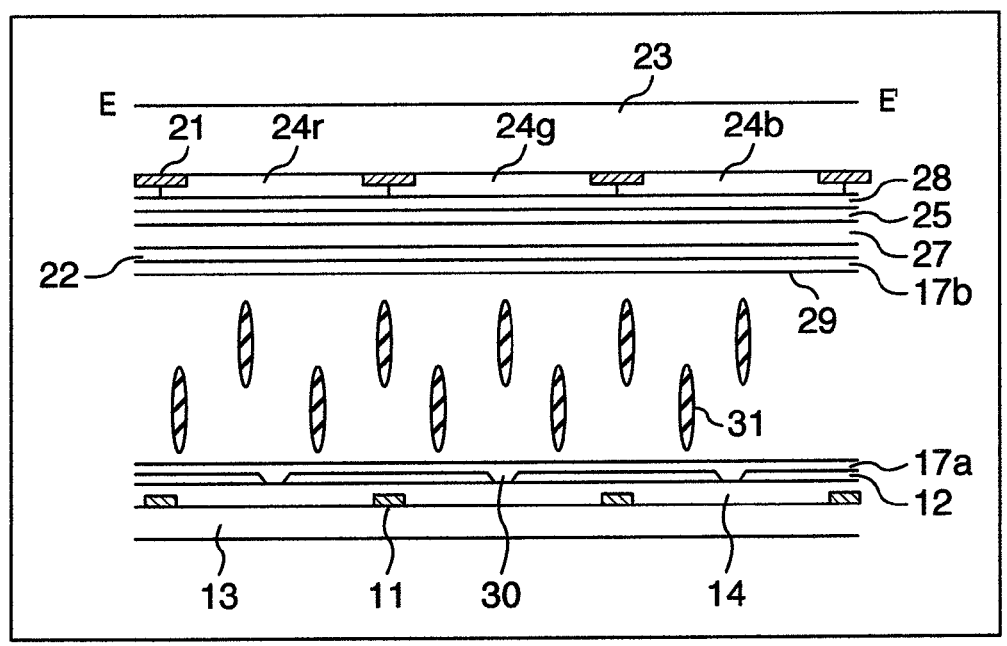
FIG. 19 is a schematic sectional view showing a liquid crystal display device according to a fifth embodiment of the present invention.

FIGS. 16 to 18 are sections of the planar structure of the liquid crystal cell 33. In particular, FIG. 17 is a schematic section cut on the D to D' and FIG. 19 is a schematic section cut on the E to E'.

The VA system LCD device is required to have a projection and a slit to be used for controlling the alignment. FIG. 16 shows the structure in which the projection 29 is formed and FIG. 18 shows the structure in which the slit 30 is formed.

The projection 29 is located so as to regulate the orientation of the liquid crystal molecules fallen down when an electric field is applied to the liquid crystal layer. It is necessary to regulate the orientation in which the vertically aligned liquid crystal molecules are fallen down when a voltage is applied thereto. Herein, as an example, the projection is used for regulating the orientation. Instead of it, an electrode slit may be used as shown in FIG. 19. In the peripheral portion of the projection 29, the aligning orientation of the liquid crystal molecules of the liquid crystal layer 31 is inclined toward the normal of the substrate according to an inclination of the edge of the projection 29. The projection 29 is formed of acrylic resin, for example. By photo-etching the acrylic resin, it is possible to form the projection 29.

The liquid crystal layer 31 is formed of a liquid crystal mixture showing a negative dielectric anisotropy, concretely, in which the dielectric constant on the major axis of the liquid crystal molecules is smaller than that on the minor axis thereof. The liquid crystal layer 31 uses as its material the liquid crystal that keeps its state in the nematic phase in the wide temperature range including a room temperature. Further, the liquid crystal layer 31 also uses as its material the liquid crystal that keeps a sufficiently high transmittance and such a high resistivity as not bringing about flickers in the TFT-based driving condition in which the resolution is QVGA (the number of lines being 240) and the driving frequency is 60 Hz. That is, it is preferable that the resistivity of the liquid crystal layer 31 is $10^{12}$ $\Omega cm^2$ or more, in particular, $10^{13}$ $\Omega cm^2$ or more.

The alignment film 17 has a function of vertically aligning the liquid crystal molecules on the surface of the substrate. Preferably, the alignment film 17 should be formed of a polyimide system organic material. An SiO vertical evaporated film, a surface active agent, or a chrome complex may be used for forming the alignment film 17.

The transflective VA-LCD device according to this fourth embodiment is arranged to built the outside retarder, which has been conventionally located on the side of the display portion, in the liquid crystal cell and thus makes it possible to thin the overall structure more than that of the conventional transflective VA-LCD device.

Fifth Embodiment

In turn, the description will be oriented to the LCD device according to another embodiment of the invention.

This embodiment concerns with the transflective VA-LCD device that makes the color change of the reflected light smaller by using the in-cell retarder without having to use the λ/2 plate having been conventionally required. This transflective VA-LCD device is arranged to use the corresponding value with each color pixel for the phase difference value of the in-cell retarder. This arrangement makes it possible to reduce the coloring degree of the reflected light and to thin the overall body more than that of the fourth embodiment.

Figure 20:
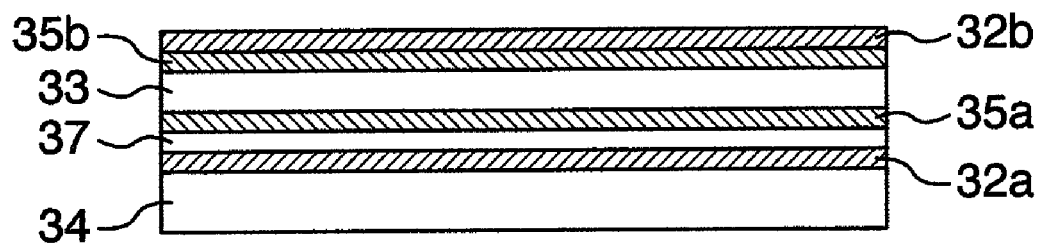
FIG. 20 is a schematic sectional view showing a liquid crystal display device according to a fifth embodiment of the present invention.

The different respect between this fifth embodiment and the fourth embodiment will be described with reference to FIG. 20. FIG. 20 shows a schematic section of the LCD device according to the fifth embodiment. The LCD device includes a pair of polarization plates 32a and 32b, a pair of optical compensation films 35a and 35b, a liquid crystal cell 33, an outside retarder 37, and a backlight unit 34.

The section of the planar structure of the liquid crystal cell is likewise to that shown in FIGS. 16 and 18. The sectional structure of the liquid crystal cell corresponds to the structure shown in FIG. 17 or 19 from which the in-cell retarder 25 is removed.

Like the second embodiment, this fifth embodiment is arranged to locate the in-cell retarder having a phase difference value for each color pixel. This arrangement makes it possible to improve the color of the reflected light when displaying a black image, thereby being able to improve the reflecting contrast ratio. Tables 2A and 2B list the axial locations and the phase difference values of the retarder of the prior art, the fourth embodiment and the fifth embodiment.

TABLE 2A

|  | Prior Art | Fourth Embodiment | Fifth Embodiment |
| --- | --- | --- | --- |
| Polarization Plate | 0° | 0° | 0 |
| Retarder | −105° | −105° | — |
| Outside Retarder | 15° | — | — |
| Optical Compensation Film | 0° | 0° | 0° |
| In-cell Retarder | — | −15° | 45° |
| Liquid Crystal | Vertical | Vertical | Vertical |
| Optical Compensation Film | 0° | 0° | 0° |
| Outside Retarder | −75° | −75° | −45° |
| Retarder | −15° | −15° | — |
| Polarization Plate | −90° | −90° | −90° |

TABLE 2B

|  | Prior Art | Fourth Embodiment | Fifth Embodiment |
|---|---|---|---|
| Polarization Plate | — | — | — |
| Retarder | 270 | 270 | — |
| Outside Retarder | 138 | — | — |
| Optical Compensation Film | 0 | 0 | 0 |
| In-cell Retarder | — | 138 | Per Pixel |
| Liquid Crystal | 0 | 0 | 0 |
| Optical Compensation Film | 0 | 0 | 0 |
| Outside Retarder | 138 | 138 | 138 |
| Retarder | 270 | 270 | — |
| Polarization Plate | — | — | — |

* The unit is (nm).

To make sure of the effect of this fifth embodiment, the reflective characteristic was theoretically calculated. It was assumed that Δn of the liquid crystal is 0.105 and Δ∈ thereof is −4.8. The LCD device was designed so that the $R_{th}$ of the liquid crystal is about 175 nm when no voltage is applied to the liquid crystal (Δnd=0.105 (for the wavelength of 550 nm) and a cell gap=1.67 μm). In this designing condition, it is preferable that each pixel has the following phase difference value of the in-cell retarder. That is, $R_{IN-R}$ has a value of about 157 nm for a wavelength of 650 nm, $R_{IN-G}$ has a value of about 132 nm for a wavelength of 550 nm, and $R_{IN-B}$ has a value of about 450 nm for a wavelength of 450 nm. In this condition, the reflecting contrast ratio was calculated. As a result, as compared with that of the fourth embodiment, the reflecting contrast ratio of this fifth embodiment was enhanced triple.

As described above, the LCD device arranged according to this embodiment makes it possible to enhance the reflecting contrast ratio without using the outside retarder and thereby to thin the overall structure more.

Sixth Embodiment

In turn, the description will be oriented to the LCD device according to another embodiment of the present invention.

This sixth embodiment concerns with the TN system transflective LCD device that aligns the liquid crystal molecules substantially in parallel to the substrate when no voltage is applied to the liquid crystal and keeps twisted at the initial alignment of the liquid crystal and then rotates the liquid crystal molecules vertically with respect to the substrate when a voltage is applied to the liquid crystal. This transflective LCD device is arranged to use the optical compensation film and build the retarder in the liquid crystal cell so that each color pixel may have the corresponding phase difference value of the in-cell retarder. The transflective TN-LCD to which this sixth embodiment is applied makes it possible to thin the overall body so that the retarder may be built in the liquid crystal cell and thereby to enhance the transmissive contrast ratio as compared with the conventional transflective TN system LCD device that has been used the outside retarder.

Figure 21:
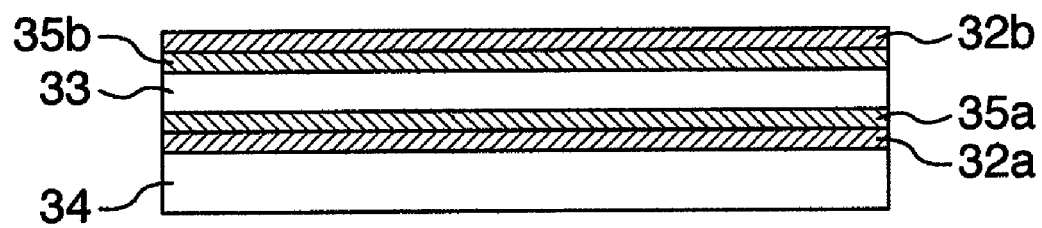
FIG. 21 is a schematic sectional view showing a liquid crystal display according to a sixth embodiment of the present invention.

The different respect between this sixth embodiment and the first embodiment will be described with reference to FIG. 21. FIG. 21 shows a schematic section of the LCD device according to this sixth embodiment. The LCD device includes a pair of polarization plates 32a and 32b, a pair of optical compensation films 35a and 35b, a liquid crystal cell 33, and a backlight unit 34.

The liquid crystal layer 31 is aligned twistedly about 90 degrees. This alignment can be achieved by rubbing the alignment films located on the first substrate 13 and the second substrate 23 so as to make these alignment films crossed at right angles. To determine the twisting direction, a chiral material may be added to the liquid crystal.

The absorption axes of the pair of polarization plates 32a and 23b are located in a manner to be crossed at right angles. Further, the slow axis of the in-cell retarder and the absorption axis of the polarization plate are located in a manner to be crossed at about 45 degrees.

It is preferable that the pair of optical compensation films 35a and 35b are the same as those described with respect to the first or the second embodiment. The axis shown in FIG. 2 is located in parallel to the absorption axis of the polarization plate closer to the axis shown in FIG. 2.

Like the second embodiment, the LCD device according to this sixth embodiment is arranged to locate the in-cell retarder having the corresponding phase difference value with each color pixel. This arrangement makes it possible to improve the color of the reflected light when displaying a black image and thereby to enhance the reflecting contrast ratio.

To make sure of the effect of this sixth embodiment, the reflective characteristic was theoretically calculated. It was assumed that Δn of the liquid crystal is 0.095 and Δ∈ thereof is 5.2. The LCD device was designed so that the retarder value of the liquid crystal of the reflective portion is about 200 nm when no voltage is applied to the liquid crystal (Δnd=0.009 (for a wavelength of 550 nm) and a cell gap=2.02 μm). In this condition, it is preferable that the in-cell retarder of each color pixel has the corresponding phase difference value. That is, $R_{IN-R}$ has a value of about 151.4 for a wavelength of 650 nm, $R_{IN-G}$ has a value of about 138.0 nm for a wavelength of 550 nm, and $R_{IN-B}$ has a value of about 115.4 nm for a wavelength of 450 nm. In this condition, the reflecting contrast ratio was calculated. As compared with the case that the in-cell retarder keeps its retarder value constant, the reflecting contrast ratio was improved triple.

As described above, the LCD device arranged according to the sixth embodiment makes it possible to enhance the reflecting contrast ratio without having to use the outside retarder for the reflective portion and thereby to thin the overall body more.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device being arranged as a transflective system comprising:
   a first substrate;
   a second substrate;
   a liquid crystal layer laid between the first and the second substrates;
   a first polarization plate located on the opposite side of the first substrate to the side on which the liquid crystal layer is located;
   a second polarization plate located on the opposite side of the second substrate to the side on which the liquid crystal layer is located;
   a plurality of pixels formed between the first and the second substrates, each of the pixels having a reflective area and a transmissive area;

an in-cell retarder located between the second substrate and the liquid crystal layer, the plurality of pixels including different color pixels, and the in-cell retarder located for the different color pixels has a predetermined phase difference relationship for the different color pixels; and an optical compensation film located between the first substrate and the first polarization plate or between the second substrate and the second polarization plate or both.

2. The liquid crystal display device as claimed in claim 1 being arranged as an ECB system.

3. The liquid crystal display device as claimed in claim 2, wherein the optical compensation film is composed of a polymer liquid crystal film formed of discotic liquid crystal and the aligning direction of the discotic liquid crystal is inclined with respect to the surface of the film and is crossed with the initial aligning direction of the liquid crystal layer of the side where the optical compensation film is located at right angles.

4. The liquid crystal display device as claimed in claim 3, wherein the plurality of pixels are arranged to have red, green and blue pixels and the in-cell retarder located for the green or the blue pixel has a larger phase difference value than the in-cell retarder located for the red pixel.

5. The liquid crystal display device as claimed in claim 4, wherein the in-cell retarder located for the blue pixel is a larger phase difference value than the in-cell retarder located for the green pixel.

6. The liquid crystal display device as claimed in claim 4, wherein a phase difference value of the in-cell retarder is quarter or less time as large as a wavelength at which the highest transmittance is brought about in each of the red, the green and the blue pixels.

7. The liquid crystal display device as claimed in claim 4, wherein the in-cell retarder is made with a halftone mask or a gray scale mask.

8. The liquid crystal display device as claimed in claim 4, wherein the in-cell retarder has a uniform thickness in each of the red, the green and the blue pixels and has a different birefringence in each of the red, the green and the blue pixels.

9. The liquid crystal display device as claimed in claim 4, wherein the planar phase difference among all the optical films located between the first polarization plate and the first substrate is 50 nm or less.

10. The liquid crystal display device as claimed in claim 4, wherein the planar phase difference among all the optical films located between the second polarization plate and the second substrate is 50 nm or less.

11. The liquid crystal display device as claimed in claim 4, wherein the in-cell retarder is located only on the reflective area of each of the pixels.

12. The liquid crystal display device as claimed in claim 4, wherein the in-cell retarder has a uniform birefringence in each of the red, the green and the blue pixels and has a difference thickness in each of the red, the green and the blue pixels.

13. The liquid crystal display device as claimed in claim 12, further comprising a step portion for adjusting the thickness of the in-cell retarder so that the step portion allows the liquid crystal layer for the transmissive area to be thinner than the liquid crystal layer for the reflective area.

14. The liquid crystal display device as claimed in claim 4, wherein the optical compensation film is composed of a polymer liquid crystal film formed of discotic liquid crystal and the aligning direction of the discotic liquid crystal is inclined with respect to the surface of the film and is crossed with the initial aligning direction of the liquid crystal layer of the side where the optical compensation film is located.

15. The liquid crystal display device as claimed in claim 1 being arranged as a VA system.

16. The liquid crystal display device as claimed in claim 15, wherein the optical compensation film is a negative C plate.

17. The liquid crystal display device as claimed in claim 16, wherein the plurality of pixels are arranged to have red, green and blue pixels, and the in-cell retarder located for the green or the blue pixel has a larger phase difference value than the in-cell retarder located for the red pixel.

18. The liquid crystal display device as claimed in claim 17, wherein the in-cell retarder located for the blue pixel has a larger phase difference value than the in-cell retarder located for the green pixel.

19. The liquid crystal display device as claimed in claim 17, wherein a phase difference value of the in-cell retarder is quarter or less time as large as a wavelength at which the highest transmittance is brought about in each of the red, the green and the blue pixels.

20. The liquid crystal display device as claimed in claim 17, wherein the in-cell retarder has a uniform thickness in each of the red, the green and the blue pixels and has a different birefringence in each of the red, the green and the blue pixels.

21. The liquid crystal display device as claimed in claim 17, wherein the planar phase difference among all the optical films located between the first polarization plate and the first substrate is 50 nm or less.

22. The liquid crystal display device as claimed in claim 17, wherein the planar phase difference among all the optical films located between the second polarization plate and the second substrate is 50 nm or less.

23. The liquid crystal display device as claimed in claim 17, wherein the in-cell retarder is located only on the reflective area of each of the pixels.

24. The liquid crystal display device as claimed in claim 17, wherein the in-cell retarder has a uniform birefringence in each of the red, the green and the blue pixels and has a difference thickness in each of the red, the green and the blue pixels.

25. The liquid crystal display device as claimed in claim 24, further comprising a step portion for adjusting the thickness of the in-cell retarder so that the step portion allows the liquid crystal layer for the transmissive area to be thinner than the liquid crystal layer for the reflective area.

26. The liquid crystal display device as claimed in claim 1, wherein the in-cell retarder located for the different color pixels has a different phase difference relationship for at least one of the different color pixels with respect to the phase difference relationship for at least another of the different color pixels.

* * * * *